United States Patent
Gupta et al.

(10) Patent No.: US 11,626,959 B2
(45) Date of Patent: Apr. 11, 2023

(54) MULTIPLEXED COMMUNICATION FOR A BASE STATION AND A PROGRAMMABLE LOGIC CONTROLLER

(71) Applicant: QUALCOMM Incorporated, San Diego, CA (US)

(72) Inventors: Piyush Gupta, Bridgewater, NJ (US); Lik Hang Silas Fong, Bridgewater, NJ (US); Hua Wang, Basking Ridge, NJ (US); Junyi Li, Franklin Park, NJ (US)

(73) Assignee: QUALCOMM INCORPORATED, San Diego, CA (US)

( * ) Notice: Subject to any disclaimer, the term of this patent is extended or adjusted under 35 U.S.C. 154(b) by 149 days.

(21) Appl. No.: 17/135,814

(22) Filed: Dec. 28, 2020

(65) Prior Publication Data
US 2021/0211260 A1 Jul. 8, 2021

Related U.S. Application Data

(60) Provisional application No. 62/956,569, filed on Jan. 2, 2020.

(51) Int. Cl.
*H04L 5/00* (2006.01)
*H04W 72/04* (2023.01)
(Continued)

(52) U.S. Cl.
CPC .......... *H04L 5/0055* (2013.01); *H04L 1/1812* (2013.01); *H04L 1/1887* (2013.01); *H04W 72/042* (2013.01)

(58) Field of Classification Search
CPC ... H04L 5/0055; H04L 1/1887; H04L 1/1812; H04W 72/042
See application file for complete search history.

(56) References Cited

U.S. PATENT DOCUMENTS

| | | | |
|---|---|---|---|
| 2010/0159935 A1* | 6/2010 | Cai | H04W 72/082 455/450 |
| 2012/0069793 A1* | 3/2012 | Chung | H04W 72/0406 370/315 |
| 2012/0218964 A1* | 8/2012 | Park | H04B 7/155 370/329 |

FOREIGN PATENT DOCUMENTS

WO 2019093934 A1 5/2019

OTHER PUBLICATIONS

Fujitsu: "Considerations on HARQ-ACK Feedback for NR-V2X Unicast", 3GPP Draft, 3GPP TSG RAN WG1 Meeting #95, R1-1812411, 3rd Generation Partnership Project (3GPP), Mobile Competence Centre, 650, Route Des Lucioles, F-06921 Sophia-Antipolis, vol. RAN WG1, No. Spokane, USA, Nov. 12, 2018-Nov. 16, 2018, (Nov. 11, 2018), XP051554327, 5 Pages, Retrieved from Internet: URL: http://www.3gpp.org/ftp/Meetings%5F3GPP%5FSYNC/RAN1/Docs/R1%2D1812411%2Ezip. [retrieved on Nov. 11, 2018] figure 1 sections 2.1, 2.2.

(Continued)

*Primary Examiner* — Brenda H Pham
(74) *Attorney, Agent, or Firm* — Procopio, Cory, Hargreaves & Savitch LLP

(57) ABSTRACT

A wireless device, such as a PLC, receives data from at least one wireless device. The wireless device transmits first feedback for the data in a downlink control channel to the at least one wireless device and transmits second feedback for the data in an uplink control channel to a base station. The base station receives the feedback in an uplink control channel and transmits a retransmission of the data to the wireless device in response to receiving the feedback.

16 Claims, 15 Drawing Sheets

(51) Int. Cl.
*H04L 1/1867* (2023.01)
*H04L 1/1812* (2023.01)

(56) References Cited

OTHER PUBLICATIONS

Fujitsu: "Other Aspects on Physical Layer Procedures for NR-V2X", 3GPP Draft, 3GPP TSG RAN WG1 #96bis, R1-1905379, 3rd Generation Partnership Project (3GPP), Mobile Competence Centre, 650, Route Des Lucioles, F-06921 Sophia-Antipolis C, vol. RAN WG1, No. Xian, China, Apr. 8, 2019-Apr. 12, 2019, (Apr. 3, 2019), XP051707452, 6 Pages, Retrieved from Internet: URL: http://www.3gpp.org/ftp/tsg%5Fran/WG1%5FRL1/TSGR1%5F96b/Docs/R1%2D1905379%2Ezip. [retrieved on Apr. 3, 2019] section 2.2.1.
International Search Report and Written Opinion—PCT/US2020/067387—ISA/EPO—dated Mar. 29, 2021.
Mediatek Inc: "Discussion on Support of Unicast, Groupcast and Broadcast", 3GPP Draft, 3GPP TSG Ran WG1 Meeting #94bis, R1-1810452, 3rd Generation Partnership Project (3GPP), Mobile Competence Centre, 650, Route Des Lucioles, F-06921 Sophia-Antipol, vol. RAN WG1, No. Chengdu, China, Oct. 8, 2018-Oct. 12, 2018, Sep. 29, 2018 (Sep. 29, 2018), XP051517861, 3 Pages, Retrieved from Internet: URL: http://www.3gpp.org/ftp/tsg%5Fran/WG1%5FRL1/TSGR1%5F94b/Docs/R1%2D1810452%2Ezip. [retrieved on Sep. 29, 2018] figure 1b section 2.1.
VIVO: "Discussion on Mode 1 Resource Allocation Mechanism", 3GPP Draft, 3GPP TSG RAN WGI Meeting #99, R1-1912021, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019 (Nov. 9, 2019), XP051823163, 18 Pages, Retrieved from the Internet: URL: https://ftp.3gpp.org/tsg_ran/WG1_RL1/TSGR1_99/Docs/R1-912021.zip. R1-191202, Mode-1 vivo.docx [Retrieved on Nov. 9, 2019] table 4.

* cited by examiner

MULTIPLEXED COMMUNICATION FOR A BASE STATION AND A PROGRAMMABLE LOGIC CONTROLLER

CROSS REFERENCE TO RELATED APPLICATION(S)

This application claims the benefit of U.S. Provisional Application Ser. No. 62/956,569, entitled "Multiplexed Communication for a Base Station and a Programmable Logic Controller" and filed on Jan. 2, 2020, which is expressly incorporated by reference herein in its entirety.

BACKGROUND

Technical Field

The present disclosure relates generally to communication systems, and more particularly, to wireless communication including retransmissions.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus receives data from at least one wireless device. Then, the apparatus transmits first feedback for the data in a downlink control channel to the at least one wireless device and transmits second feedback for the data in an uplink control channel to a base station.

In an aspect of the disclosure, a method, a computer-readable medium, and an apparatus are provided for wireless communication at a base station. The base station receives, in an uplink control channel from a wireless device, first feedback for data from at least one additional wireless device, where the first feedback is multiplexed in a same symbol with second feedback for the data in a downlink control channel to the at least one additional wireless device. Then, the base station transmits a retransmission of the data to the wireless device in response to receiving the first feedback.

To the accomplishment of the foregoing and related ends, the one or more aspects comprise the features hereinafter fully described and particularly pointed out in the claims. The following description and the annexed drawings set forth illustrative features of the one or more aspects. These features are indicative, however, of but a few of the various ways in which the principles of various aspects may be employed, and this description is intended to include all such aspects and their equivalents.

DETAILED DESCRIPTION

Figure 1:
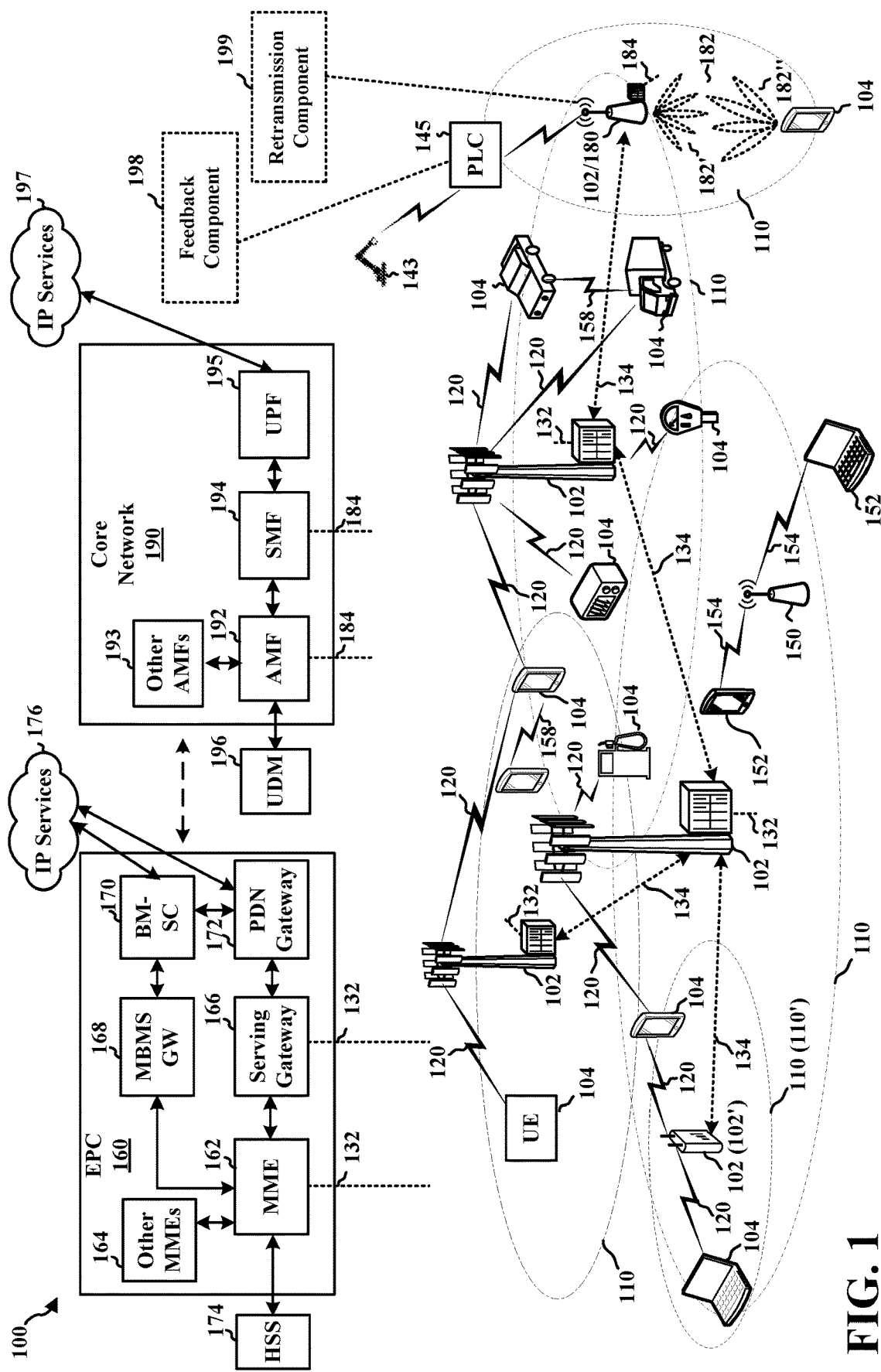
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Some wireless communication may be performed in connection with factory automation, e.g., and may comprise Industry IoT (IIoT) based communication. Some equipment may include a sensor, an actuator, a piece of industrial equipment, etc. As illustrated in the communication system 100 of FIG. 1, a Programmable Logic Controller (PLC) 145 may receive information from such sensor(s)/actuator(s) 143 and may provide commands to the sensor(s)/actuator(s) 143 or to factory equipment associated with the sensor(s)/actuator(s) 143. For example, a PLC 145 may automate control of machines and control systems of industrial electromechanical processes, such as controlling machinery on factory assembly lines, amusement rides, light fixtures, etc. The communication between the PLC 145 and the sensors/actuators 143 may have low latency requirements and high reliability requirements. For example, the communication may a latency requirement of less than 2 ms or less than 1 ms. The communication may have a reliability requirement on the order of $10^{-5}$ or $10^{-6}$, such as 99.9999% reliability. The latency and reliability may apply to data and control channels.

Aspects of the present disclosure help to reduce latency and improve reliability by providing for retransmission of blocked transmissions between a PLC 145 and a sensor/actuator 143, the retransmission being provided by a base station, e.g., the base station 102 or 180. For example, a PLC 145 may receive data from a sensor/actuator 143 and may transmit first feedback for the data in a control channel to the sensor(s)/actuator(s) 143 may and transmit second feedback for the data in an uplink control channel to a base station 102 or 180. The base station 102 or 180 may receive the second feedback in the uplink control channel from the PLC 145, e.g., for the data from the sensor/actuator 143 and may respond by transmitting a retransmission of the data from the sensor/actuator 143 to the PLC 145.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery.

The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Some wireless communication may be performed in connection with factory automation, e.g., and may comprise Industry IoT (IIoT) based communication. Some equipment may include a sensor, an actuator, a piece of industrial equipment, etc. A Programmable Logic Controller (PLC) 145 may receive information from such sensor(s)/actuator(s) 143 and may provide commands to the sensor(s)/actuator(s) 143 or to factory equipment associated with the sensor(s)/actuator(s) 143. For example, a PLC may automate control of machines and control systems of industrial electromechanical processes, such as controlling machinery on factory assembly lines, amusement rides, light fixtures, etc. In some aspects, a PLC 145 may receive data, either uplink data or sidelink data, from sensor(s)/actuator(s) 143. The PLC 145 may include a feedback component 198 configured to transmit first feedback for the data in a downlink control channel to the sensor(s)/actuator(s) 143 and to transmit second feedback for the data in an uplink control channel to a base station 102/180. The base station 102/180 may receive the second feedback in an uplink control channel from the PLC 145 for the data from the sensor(s)/actuator(s) 143, where the first feedback is multiplexed in a same symbol with the first feedback in the downlink control channel to the sensor(s)/actuator(s) 143. Then, the base station 102/180 may include a retransmission component 199 configured to transmit a retransmission of the data from the sensor(s)/actuator(s) 143 to the PLC 145 in response to receiving the first feedback. In some examples, the base station 102/180 may include a 5G NR base station, such as a gNB. The concepts described herein may also be applicable to other similar areas, such as LTE, LTE-A, CDMA, GSM, and other wireless technologies.

Figure 2:
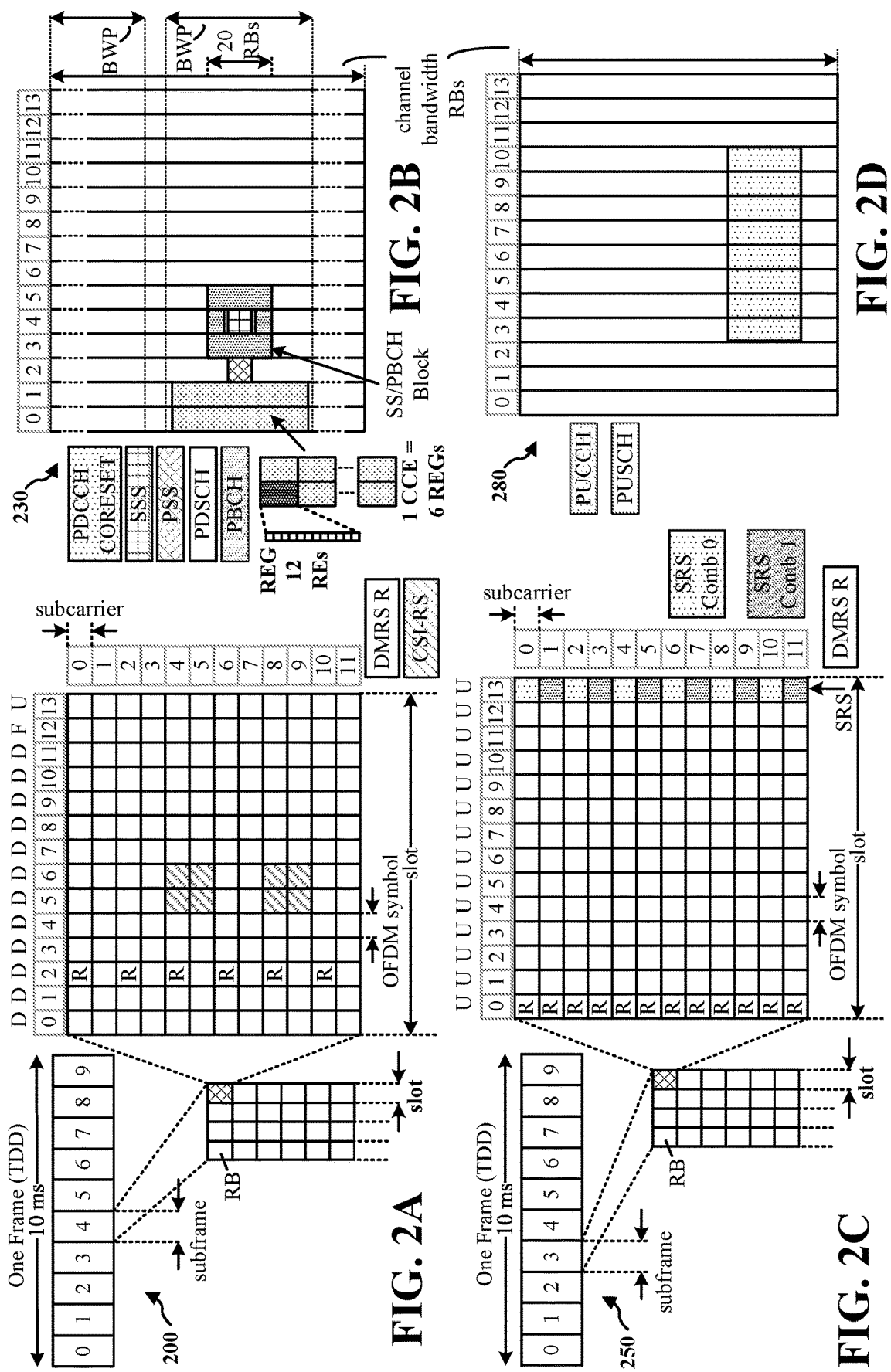
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of slot configuration 0 with 14 symbols per slot and numerology $\mu$=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
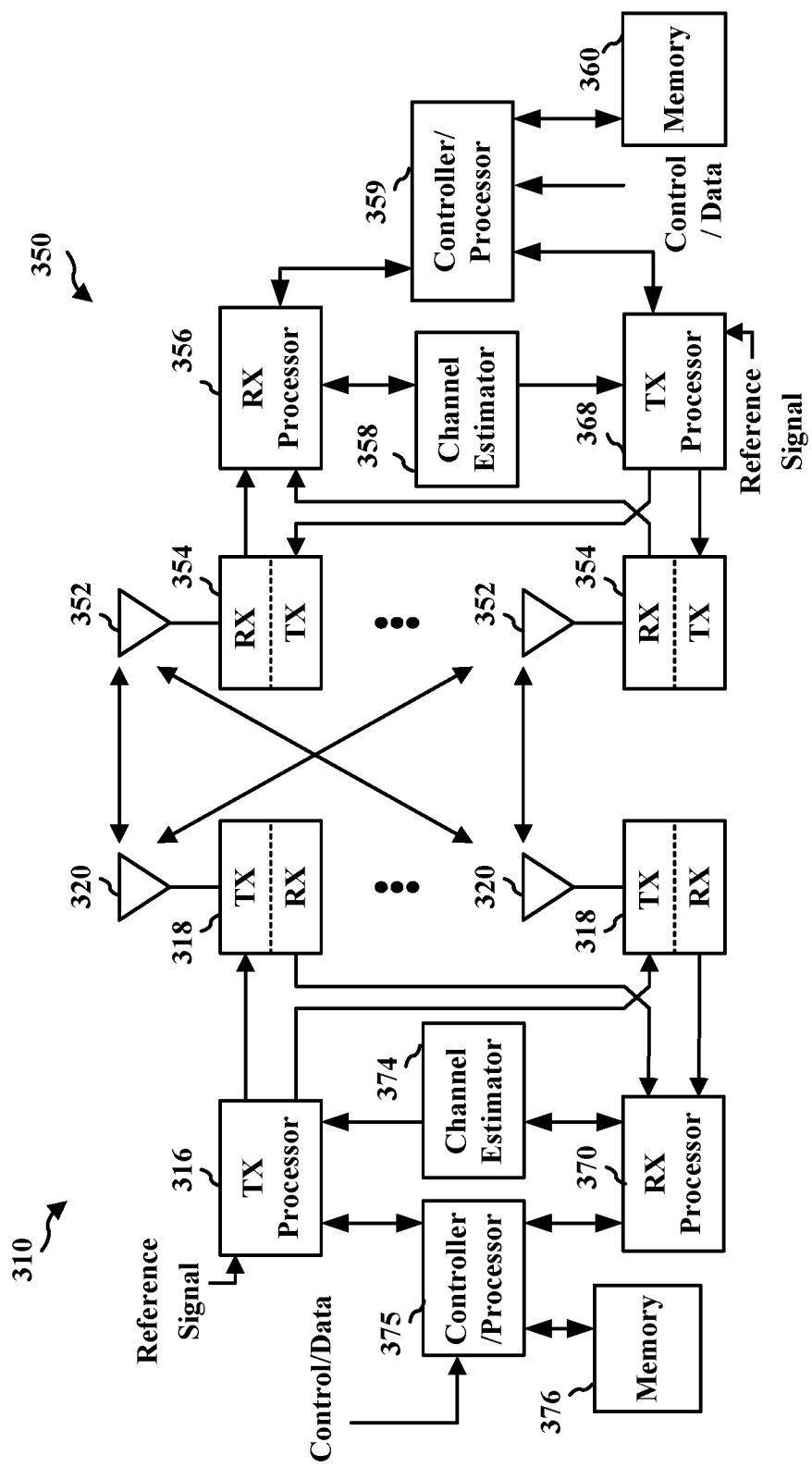
FIG. 3 is a diagram illustrating an example of a base station and user equipment (UE) in an access network.

FIG. 3 is a block diagram of a base station 310 in communication with a wireless device 350 in an access network. The wireless device may correspond to a PLC, a UE, a sensor/actuator, etc. In some examples, a PLC may transmit downlink communication to a sensor/actuator, and therefore, may operate similarly to base station 310. For example, the wireless device 350 may correspond to the PLC 145 in FIG. 1. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the device 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Figure 4A:
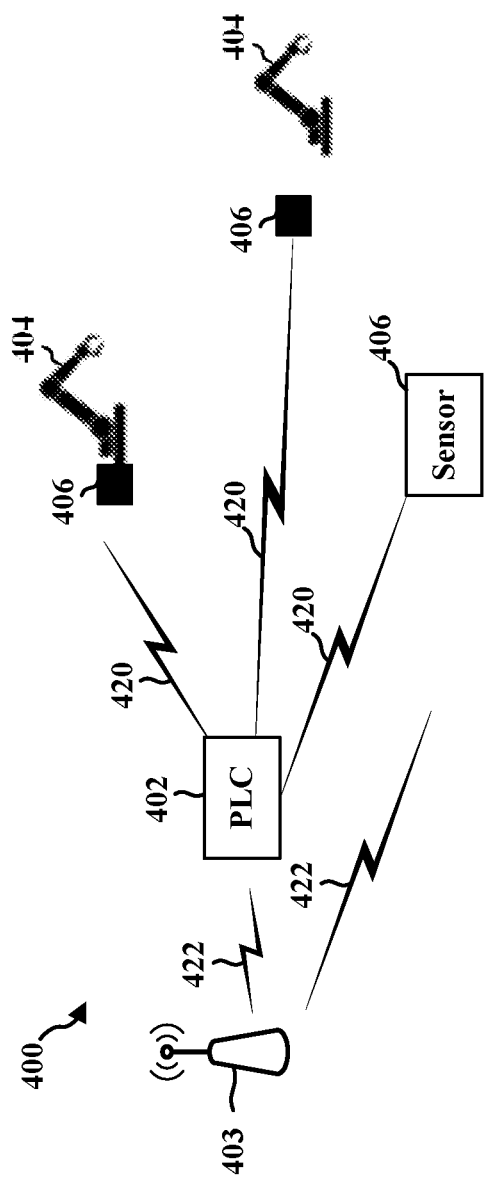
FIG. 4A illustrates an example wireless communication system including a base station, a PLC, and sensor(s)/actuator(s).

Wireless communication may be based on IIoT. Such communication may include communication between a PLC and sensors, actuators, etc. The PLC may provide commands in wireless signals to factory equipment. Sensor(s)/actuator(s) may be separate from the factory equipment and/or may be comprised in or positioned at a piece of factory equipment. The PLC(s) may automate control of machines and control systems, e.g., of industrial electromechanical processes, such as control of machinery on factory assembly lines, amusement rides, light fixtures, etc. FIG. 4A illustrates an example communication system 400 including a PLC 402 that exchanges wireless communication 420 with sensors/actuators 406 that may be associated with equipment 404. The communication may also include a base station 403 that exchanges communication 422 with the PLC 402 and/or communication 422 with the sensors/actuators 406.

The communication between the PLC 402 and sensor(s)/actuator(s) 406 may include cyclic exchanges of information. The PLC 402 may potentially exchange cyclic information with a large number of sensors/actuators 406.

Figure 4B:
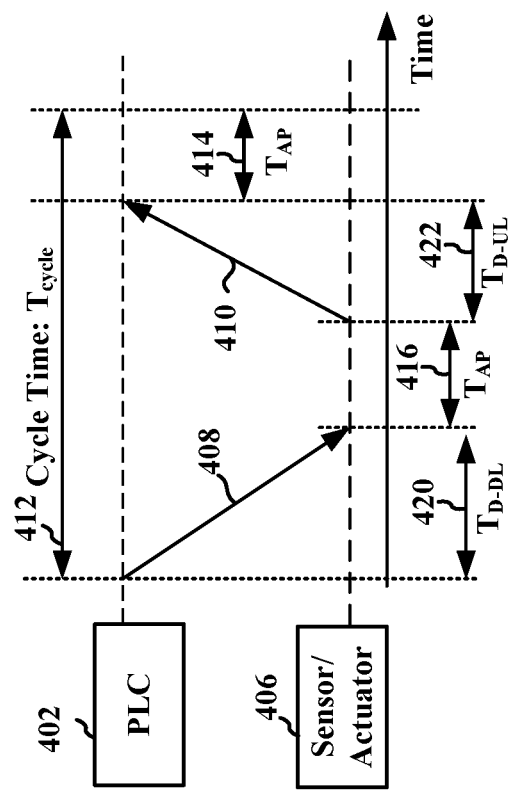
FIG. 4B illustrates an example communication cycle between a PLC, and a sensor/actuator.

FIG. 4B illustrates an example of periodic or cyclic traffic that may be exchanged between the PLC 402 and a sensor/actuator 406. The PLC 402 may transmit communication 408 such as a command or other communication to sensor/actuator 406 or equipment 404 during a period of time TD-DL, 420. The communication 408 from the PLC to the sensor/actuator may be referred to as downlink communication. The sensor/actuator 406 may receive the communication 408, and may take an action based on the command. Following the action, the sensor/actuator 406 may transmit communication 410 back to the PLC 402 during period of time TD-UL, 422. For example, a sensor may respond with location information, temperature information, etc. The sensor may report back to the PLC 402 a result that occurs due to action from a command received from the PLC 402. The report may comprise an acknowledgement, e.g., a simple application layer acknowledgment. As well, the sensor may report a current status of the sensor following a command, e.g., an updated location, etc. There may be a processing time duration 416 ($T_{AP}$) e.g., an actuation and/or sensing duration between receipt of the communication 408 from the PLC and transmission of the communication 410 from the sensor/actuator 406. The communication 410 that is transmitted from the sensor/actuator 406 to the PLC 402 may be referred to as uplink communication. Following the PLC's receipt of the communication 410 from the actuator/sensor 406, there may be a processing duration 414 ($T_{AP}$) during which the PLC 402 processes the received information, e.g., communication 410, and before the PLC 402 sends additional communication/commands to the actuator/sensor 406. The combined cycle may have a duration $T_{cycle}$ 412. Following the duration $T_{AP}$, the cycle may repeat with the PLC 402 sending additional communication 408 to the sensor/actuator 406. The communication system 400 may accommodate periodic, regular traffic between PLCs 402 and sensors/actuators 406, e.g., downlink traffic from the PLC 402 to the sensors/actuators 406 and uplink traffic from the sensors/actuators 406 to the PLC 402. The communication between the PLC and the sensors/actuators 406 may be associated with a low latency and high reliability. For example, the communication may be based on a latency of less than 2 ms or less than 1 ms. The communication may have a reliability requirement on the order of $10^{-5}$ or $10^{-6}$, such as 99.9999% reliability. The latency and reliability may apply to data and control channels.

Figure 5:
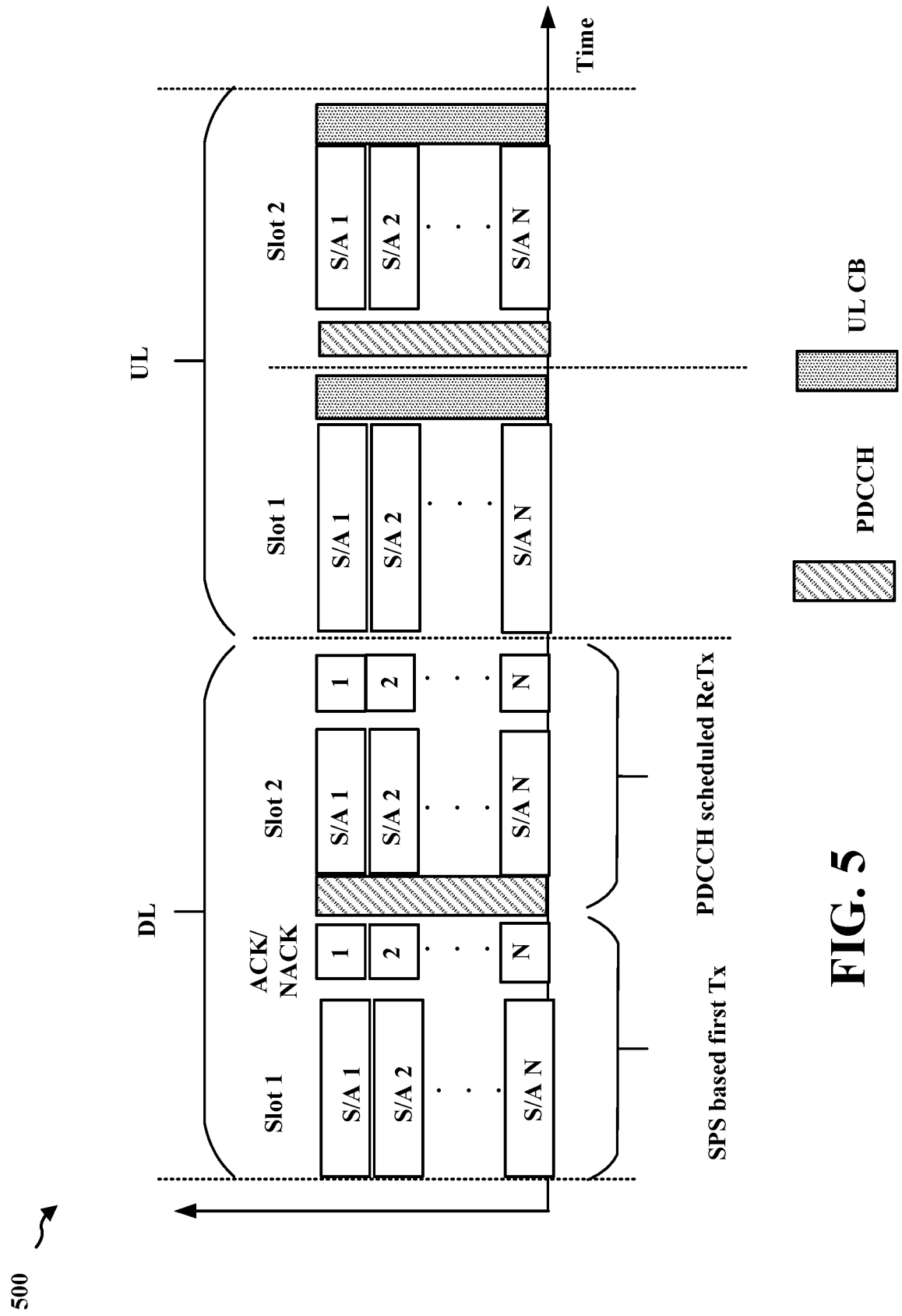
FIG. 5 illustrates an example use of wireless resources for transmission of control and data between a PLC and sensor(s)/actuator(s).

The PLC may use a control channel, such as a PDCCH, to grant resources to a sensor/actuator 406 for use in transmitting the periodic uplink communication 410. Factory automation may involve a high sensor/actuator 406 density, e.g., approximately 1 UE per $m^2$. Therefore, a large number of sensors/actuators 406 may communicate with the PLC 402. Sending a dynamic grant, e.g., one DCI per slot, to each of the large number of sensors/actuators 406 may place a burden on PDCCH overhead. Semi-Persistent Scheduling (SPS) may be used to reduce the overhead requirements of PDCCH by enabling the sensors/actuators 406 to be granted resources in a semi-persistent or periodic manner. SPS may also be used to schedule resources for receiving downlink communication. The SPS may be communicated to each sensor/actuator 406 using RRC signaling and/or DCI. In some examples, SPS may be used for a first transmission, and PDCCH may be used to schedule a possible retransmission if the first transmission is not accurately received. FIG. 5 illustrates a communication diagram 500 showing downlink transmissions from a PLC to sensor/actuator 1 (S/A 1), sensor/actuator 2 (S/A 2 and so forth until the downlink transmission for sensor/actuator N (S/A N) in a slot 1 based on SPS. ACK/NACK feedback is received from each of the sensors/actuators. Based on the feedback, the PLC may transmit PDCCH to schedule resources for a retransmission of the information to the sensors/actuators from which a NACK is received or from which an ACK is not received. For uplink communication, the PLC may receive uplink transmissions from sensor/actuator 1 (S/A 1), sensor/actuator 2 (S/A 2), . . . , sensor/actuator N (S/A N) in a slot 1 based on SPS. The PLC may provide ACK/NACK feedback to each of the sensor/actuators. The PLC may transmit PDCCH to the sensors/actuators scheduling a retransmission for information that was not correctly received by the PLC.

Figure 6:
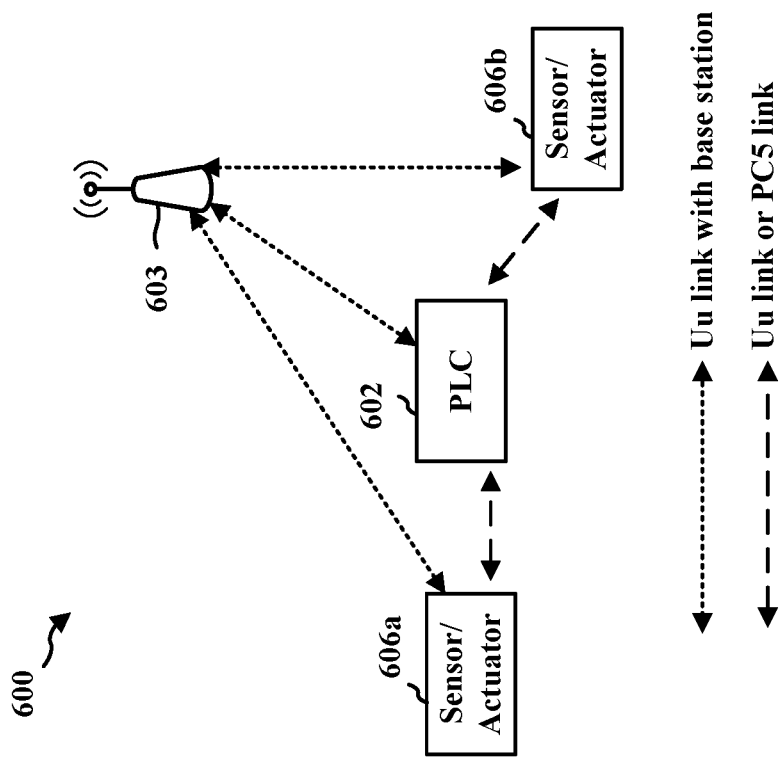
FIG. 6 illustrates example aspects of a wireless communication system including a base station, a PLC, and sensor(s)/actuator(s).

A wirelessly connected PLC may be located closer to factory equipment. For example, PLCs may be located close to machinery, whereas a base station may be ceiling mounted or at a greater distance from the equipment. FIG. 6 illustrates a communication system 600 that includes a PLC 602, multiple sensors/actuators 606a and 606b, and a base station 603. As illustrated, the link between the base station 603 and the PLC may be based on a Uu interface. The links between the base station 603 and the sensors/actuators 606a and 606b may be based on a Uu interface. The links between the PLC 602 and the sensors/actuators 606a and 606b may be based either on a Uu interface or a PC5 interface. The PLC 602 may operate as a small cell using Uu or as a sidelink device using PC5. In some examples, the base station 603 may control communication between the PLC 602 and the sensors/actuators 606. For example, the PLC may provide control information, such as scheduling for retransmissions of uplink information from a sensor/actuator 606 to the base station 603 and the base station may transmit the PDCCH scheduling the retransmission. The transmission of control by the base station may help to improve reliability. This may involve two hops in order to provide the control to the sensor/actuator. In some examples, the base station 603 may provide some control for the communication between the PLC 602 and the sensors/actuators 606. Thus, some scheduling for the sensors/actuators 606a and 606b may be provided by the base station 603, and some scheduling for the sensor/actuators 606a and 606b may be provided by the PLC 602. Providing some control directly from the PLC may help to reduce over-the-air signaling and may improve latency. However, transmissions from the PLC may be blocked for a sensor/actuator.

Figure 7:
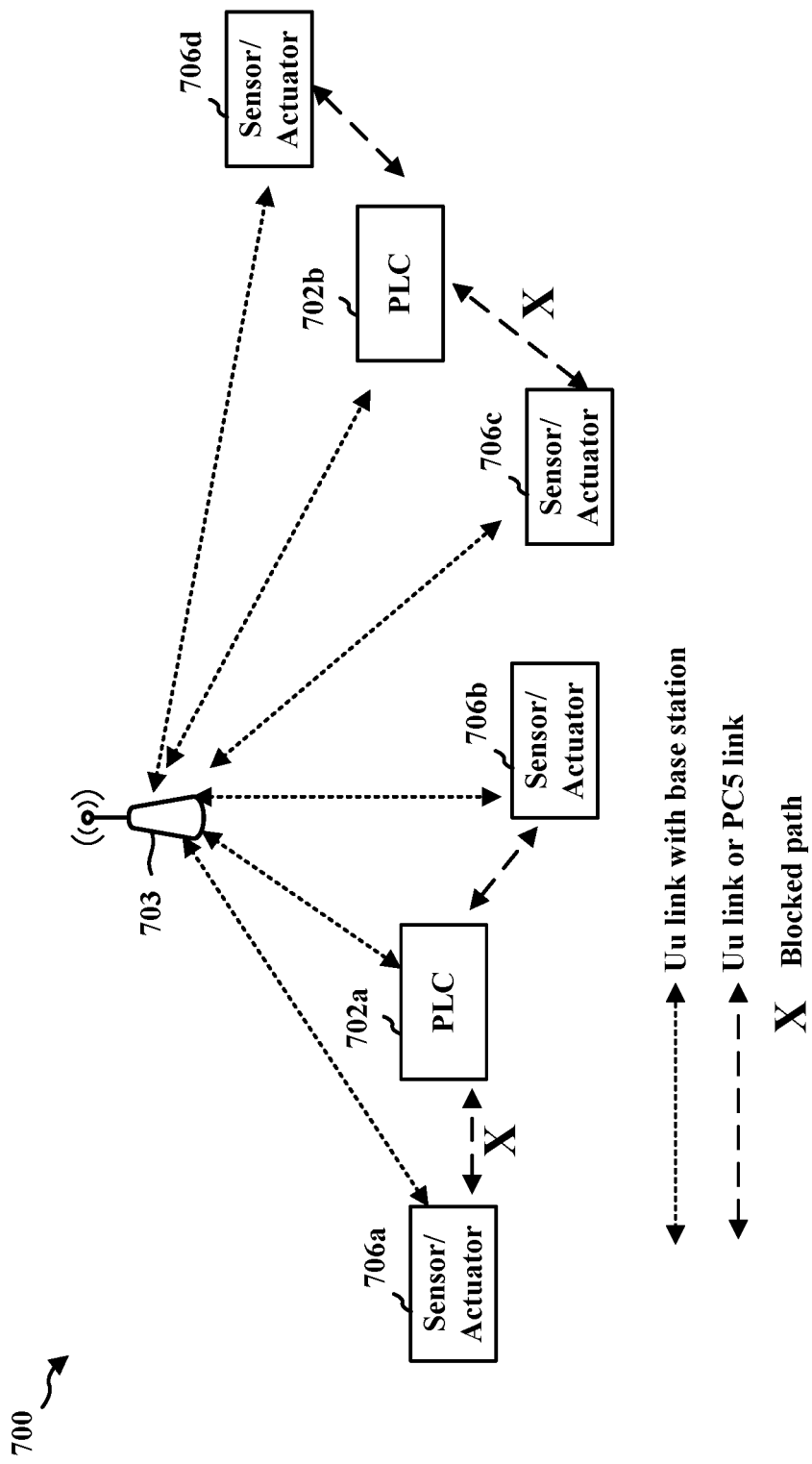
FIG. 7 illustrates example aspects of a wireless communication system including a base station, a PLC, and sensor(s)/actuator(s).

FIG. 7 illustrates a communication system 700 that includes PLCs 702a and 702b, multiple sensors/actuators 706a, 706b, 706c, 706d, and a base station 703. In FIG. 7, the transmission path between PLC 702a and sensor/actuator 706a is blocked, and the transmission path between PLC 702b and sensor/actuator 706c is blocked. In FIG. 7, the PLC 702a may transmit a first transmission, e.g., based on SPS scheduling, directly to sensor/actuators 706a and 706b. The PLC 702b may transmit a first transmission to sensor/actuators 706c and 706d. The first transmission may be transmitted by the PLCs to the sensor/actuators using Uu or PC5 based signaling. If a first transmission from a PLC is not accurately received by sensor/actuator, the base station 703 may send a retransmission. The base station may receive the first transmission from the PLC and may receive feedback or a request for retransmission from the sensor/actuator. In response to the feedback or request for retransmission, the base station 703 may retransmit the first transmission that was initially transmitted by the PLC. For example, the base station 703 may receive the first transmission that is sent by the PLC 702a to the sensor/actuators 706a and sensor/actuator 706b. As the transmission path between the PLC 702a and sensor/actuator 706a is blocked, the sensor/actuator 706a may send HARQ feedback, such as a NACK, or may request a retransmission. The base station may receive the NACK or the retransmission request from the sensor/actuator 706a and may retransmit the first transmission that the base station received from the PLC 702a. Similarly, the base station 703 may provide a retransmission for sensor/actuator 706c for the first transmission from the PLC 702b. A retransmission may be based on scheduling from the respective PLC. The retransmission may be based on PDCCH scheduling from the base station.

The communication system may have reduced latency because the first transmission is provided directly from the PLC 702a or 702b to the corresponding sensor/actuator 706a-d and is also received by the base station 703 so that the base station can provide a retransmission. The communication system also provides improved reliability through the retransmission from the base station. A base station 703 may be positioned at a height or location that provides better coverage than the PLC 702a or PLC 702b. The base station 703 may provide an elevated transmission/reception point across PLCs. Therefore, a reduced number of transmission/reception points may be deployed for each PLC. The base station 703 may coordinate retransmissions to different sensors/actuators or UEs across the PLCs 702a, 702b, etc.

In some examples, a blocked transmission may be identified based on a previous transmission failure between a PLC and a sensor/actuator or a pattern of previous failures between the PLC and the sensor/actuator. Thus, a PLC-sensor/actuator link may be determined to be more prone to failure. The first transmission from the PLC to the sensor/actuator may be transmitted using reserved resources that enable the base station 703 to also decode the first transmission. Based on HARQ feedback (such as a NACK or a lack of an ACK) or a request for retransmission from the sensor/actuator, the base station may retransmit the transmission from the PLC to the sensor/actuator. This example may be referred to as a proactive base station fallback.

In other examples, if a first transmission from a PLC to a sensor/actuator fails, the PLC may send a retransmission to the base station 703, and the base station may subsequently forward the retransmission to the sensor/actuator. The PLC may send the retransmission to the base station using reserved resources so that the base station can receive the retransmission. This example may be referred to as a reactive base station fallback.

The base station 703 may send the retransmission to a target sensor/actuator using reserved retransmission resources. As the PLC may also provide a retransmission, control and data transmissions and retransmissions may be multiplexed for the PLC and the base station.

Although the example has been provided for a failure of a transmission from a PLC to a sensor/actuator, the concepts presented herein may also be applied to first transmissions from a sensor/actuator to a PLC. For example, the base station 703 may receive a first transmission from the sensor/actuator 706a that is not received by the PLC 702a due to the blocked transmission path. The PLC 702a may provide HARQ feedback (such as a NACK or the absence of an ACK) or a request for a retransmission to the sensor/actuator 706a and/or the base station 703. The base station 703 may respond to the HARQ feedback or the request for a retransmission by sending a retransmission of the sensor/actuator's transmission to the PLC 702a.

The base station 703 may send the retransmission to the PLC 702a using reserved retransmission resources. As the sensor/actuator 706a may also provide a retransmission, control and data transmissions and retransmissions may be multiplexed for the PLC and the sensor/actuator.

Figure 8:
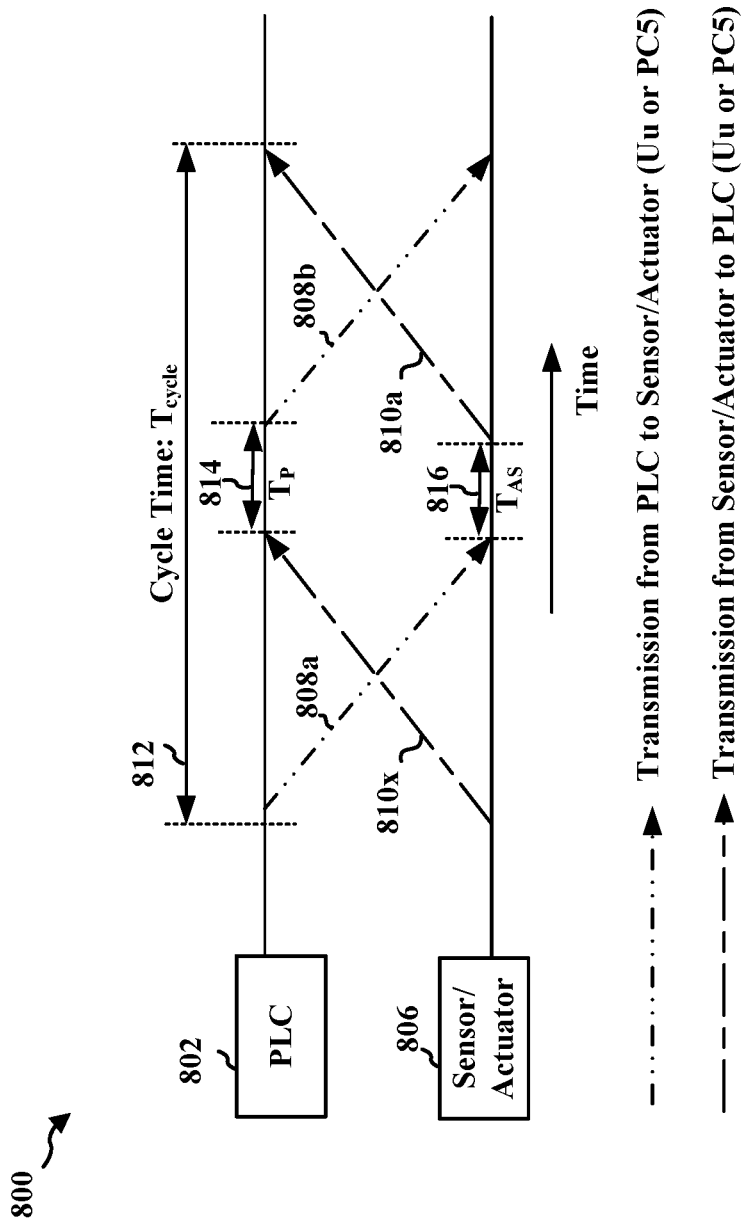
FIG. 8 illustrates an example communication cycle between a PLC, and a sensor/actuator.

FIG. 8 illustrates an example of two-phase cyclic traffic 800 that may be exchanged between the PLC 802 and a sensor/actuator 806. The PLC 802 may correspond to the PLC 702a or 702b. The sensor/actuator 806 may correspond to sensor/actuator 706a, 706b, 706c, or 706d. The traffic between a PLC and a sensor/actuator may be based on the pattern described in connection with FIG. 4B. The PLC 802 may transmit communication 808a such as a command or other communication to sensor/actuator 806, and in response may receive an uplink or sidelink transmission 810a from the sensor/actuator 806. The PLC 802 may send an additional transmission 808b in an overlapping manner with communication 810a from the sensor/actuator 806. Similarly, the transmission 808a may overlap with another transmission 810x from the sensor/actuator 806 that is based on a prior command/instruction from the PLC 802. There may be a processing time duration 816 ($T_{AS}$) e.g., an actuation and/or sensing duration between receipt of the communication 808a from the PLC 802 and transmission of the communication 810x from the sensor/actuator 806. There may be a processing duration 814 ($T_P$) during which the PLC 802 processes the received information, e.g., transmission 810x, and before the PLC 802 sends communication 808b to the actuator/sensor 806. The combined cycle 812 may have a duration $T_{cycle}$. The cycle may repeat, e.g., in a periodic manner, with the PLC 802 sending and receiving additional communication to the sensor/actuator 806.

Figure 9:
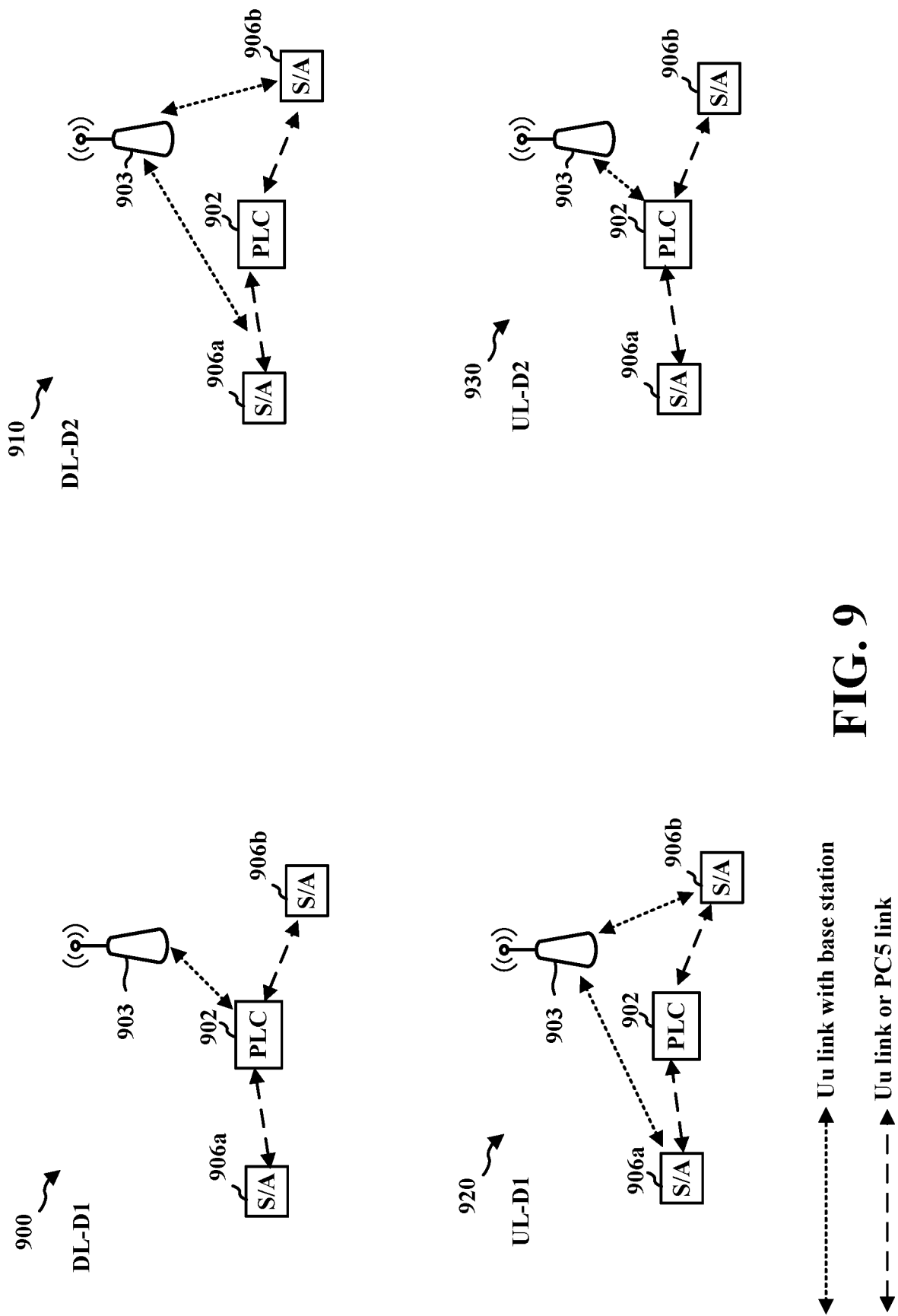
FIG. 9 illustrates example aspects of a wireless communication system including a base station, a PLC, and sensor(s)/actuator(s).

FIG. 9 illustrates four example phases of traffic that may be exchanged between a base station 903, a PLC 902, and sensors/actuators 906a and 906b. The PLC 902 may correspond to the PLC 702a or 702b, or 802. The sensor/actuator 906a and 906b may correspond to sensor/actuator 706a, 706b, 706c, 706d, or 806. The communication may have a reliability on the order of $10^4$. In a first example 900, the PLC 902 may transmit a first transmission to the sensor/actuators 906a and 906b and to the base station 903. The first example 900 may be referred to as the "DL-D1" phase. The first transmission may include a downlink transmission, e.g., a PDSCH transmission. In another example, the first transmission may be based on sidelink, e.g., a PSSCH transmission. The first transmission may be based on SPS.

In the second example 910, the base station 903 may retransmit the transmission, which was initially transmitted by the PLC 902, to the sensor/actuators 906a and 906b. The retransmission may be sent in response to HARQ feedback or a request for retransmission from the sensor/actuators 906a and 906b. In another example, the retransmission may be in response to a request from the PLC 902. The second example 910 may be referred to as the "DL-D2" phase. The retransmission may be sent as PDSCH. The retransmission may be scheduled by PDCCH from the base station 903 or PDCCH/PSCCH from the PLC.

In the third example 920, the sensor/actuators 906a and 906b may transmit an initial uplink transmission to the PLC 902, which may also be received by the base station 903. The third example 920 may be referred to as the "UL-D1" phase. The first transmission may include an uplink transmission, e.g., a PUSCH transmission. In another example, the first transmission may be based on sidelink, e.g., a PSSCH transmission. The first transmission may be based on SPS.

In the fourth example 930, the base station 903 may retransmit the transmission, which was initially transmitted by the sensor/actuators 906a and 906b, to the PLC 902. The fourth example 930 may be referred to as the "UL-D2" phase. The retransmission may be sent in response to HARQ feedback or a request for retransmission from the sensor/actuators from the PLC 902. The retransmission may be sent as PDSCH. The retransmission may be scheduled by PDCCH from the base station 903 or PDCCH/PSCCH from the PLC.

Figure 10:
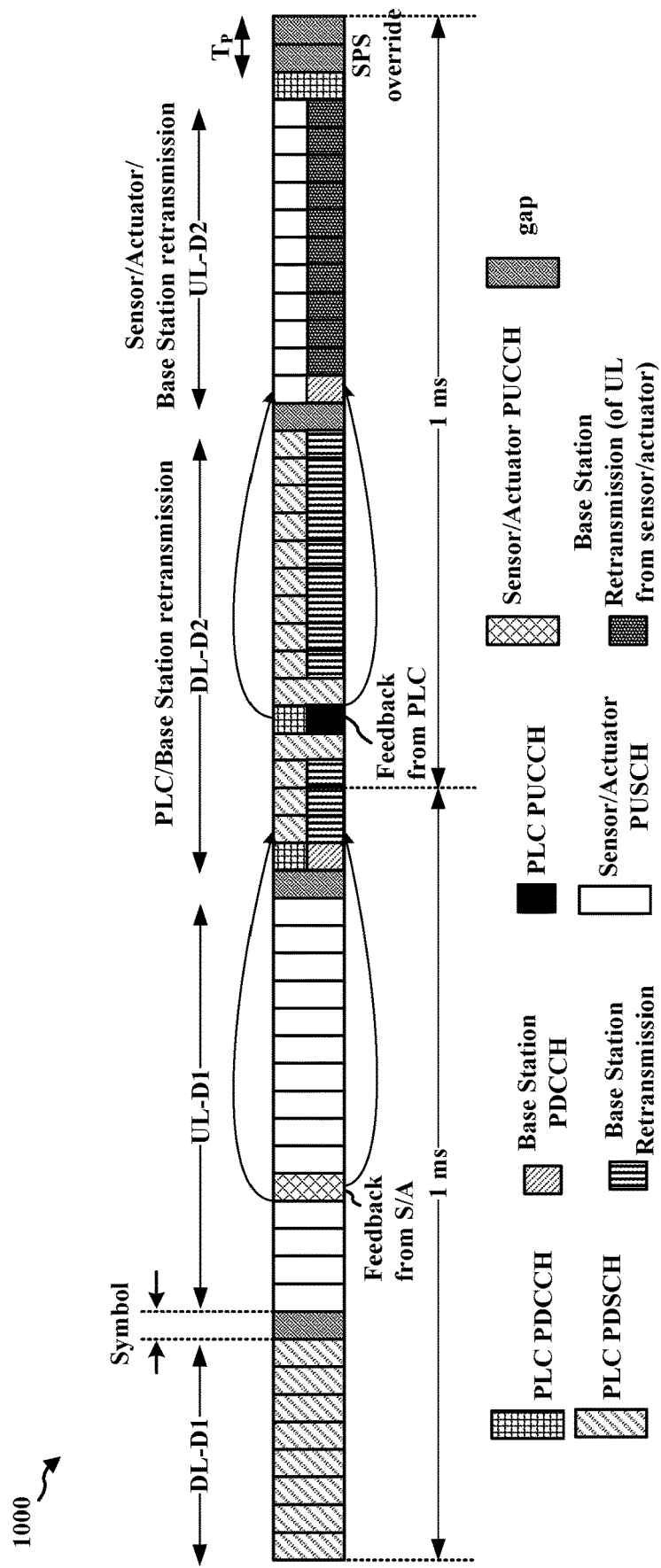
FIG. 10 illustrates an example use of wireless resources for transmission of control and data.

Communication based on some of the examples 900, 910, 920, and 930 may overlap in time. FIG. 10 illustrates an example of multiplexed communication 1000 between a PLC, a base station, and one or more sensor/actuators. The PLC may correspond to the PLC 702a or 702b, or 802, or 902. The sensor(s)/actuator(s) may correspond to sensor/actuator 706a, 706b, 706c, 706d, 806, 906a, or 906b. FIG. 10 illustrates that the PLC may transmit an initial transmission to a sensor/actuator during a DL-D1 phase. Although the example illustrates PDSCH, the PLC may similarly transmit the initial transmission as PSSCH using a PC5 link with a sensor/actuator. During an UL-D1 phase, the sensor/actuator may respond with a transmission to the PLC. Although the example illustrates PUSCH, the sensor/actuator may similarly transmit the initial transmission as PSSCH using a PC5 link with the PLC. During the UL-D1 phase, the sensor/actuator may provide HARQ feedback or a request for retransmission in a control channel. Although the example illustrates PUCCH, the sensor/actuator may similarly transmit the feedback/request for retransmission as PSCCH using a PC5 link with the PLC.

If the HARQ feedback is a NACK or an absence of an ACK or if the sensor/actuator sends a request for retransmission, the retransmission may be provided during the DL-D2 phase. The PLC may send control signaling scheduling the retransmission. FIG. 10 illustrates the PLC sending PDCCH scheduling the retransmission. However, the retransmission may also be scheduling using PSCCH. A base station may also send PDCCH scheduling a retransmission from the base station. In some examples, the PDCCH from the base station and the control channel from the PLC scheduling the retransmission may overlap, e.g., in a same symbol. For example, the PDCCH from the base station may be frequency division multiplexed (FDM) with the PLC's control channel. In other examples, the scheduling may be sent in different, non-overlapping symbols.

Following the scheduling, the PLC may transmit a retransmission to the to a sensor/actuator during a DL-D2 phase. Although the example illustrates the retransmission as PDSCH, the PLC may similarly transmit the retransmission as PSSCH using a PC5 link with a sensor/actuator. The base station also transmits the retransmission as PDSCH. As illustrated, the retransmission from the base station and the retransmission from the PLC may be multiplexed, e.g., overlapping in one or more symbols. For example, the PDSCH may be frequency division multiplexed (FDM) with the PLC's retransmission.

During the UL-D2 phase, the PLC may provide HARQ feedback or a request for retransmission in a control channel about the initial transmission from the sensor/actuator during the UL-D1 phase. Although the example illustrates PDCCH, the PLC may similarly transmit the feedback/request for retransmission as PSCCH using a PC5 link with the sensor/actuator. As illustrated in FIG. 10, the base station may schedule the retransmission to include a gap period surrounding the time when the PLC will provide the feedback/retransmission request. For example, the base station may skip the PDSCH retransmission in one or more symbols surrounding a symbol in which the PLC will provide the feedback/retransmission request. This may enable the base station to switch between the PDSCH retransmission to the sensor/actuator and reception of the feedback/retransmission request from the PLC. The base station may monitor for feedback from multiple PLCs. The base station may assign different resources to each of the PLCs. The different resources may include different time resources and/or different frequency resources. The different PLCs may use their respective, assigned resources to transmit feedback/retransmission requests to the base station.

If the HARQ feedback from the PLC is a NACK or an absence of an ACK or if the PLC sends a request for retransmission, the retransmission may be provided during the UL-D2 phase. As illustrated in FIG. 10, the base station may provide the retransmission, of the initial transmission from the sensor/actuator, as a PDSCH transmission to the PLC. The sensor/actuator may also send a retransmission, e.g., as PUSCH or PSSCH. The retransmission from the base station may overlap, at least partially, with the retransmission from the sensor/actuator. For example, the PDSCH may be frequency division multiplexed (FDM) with the sensor/actuator's retransmission.

Figure 11:
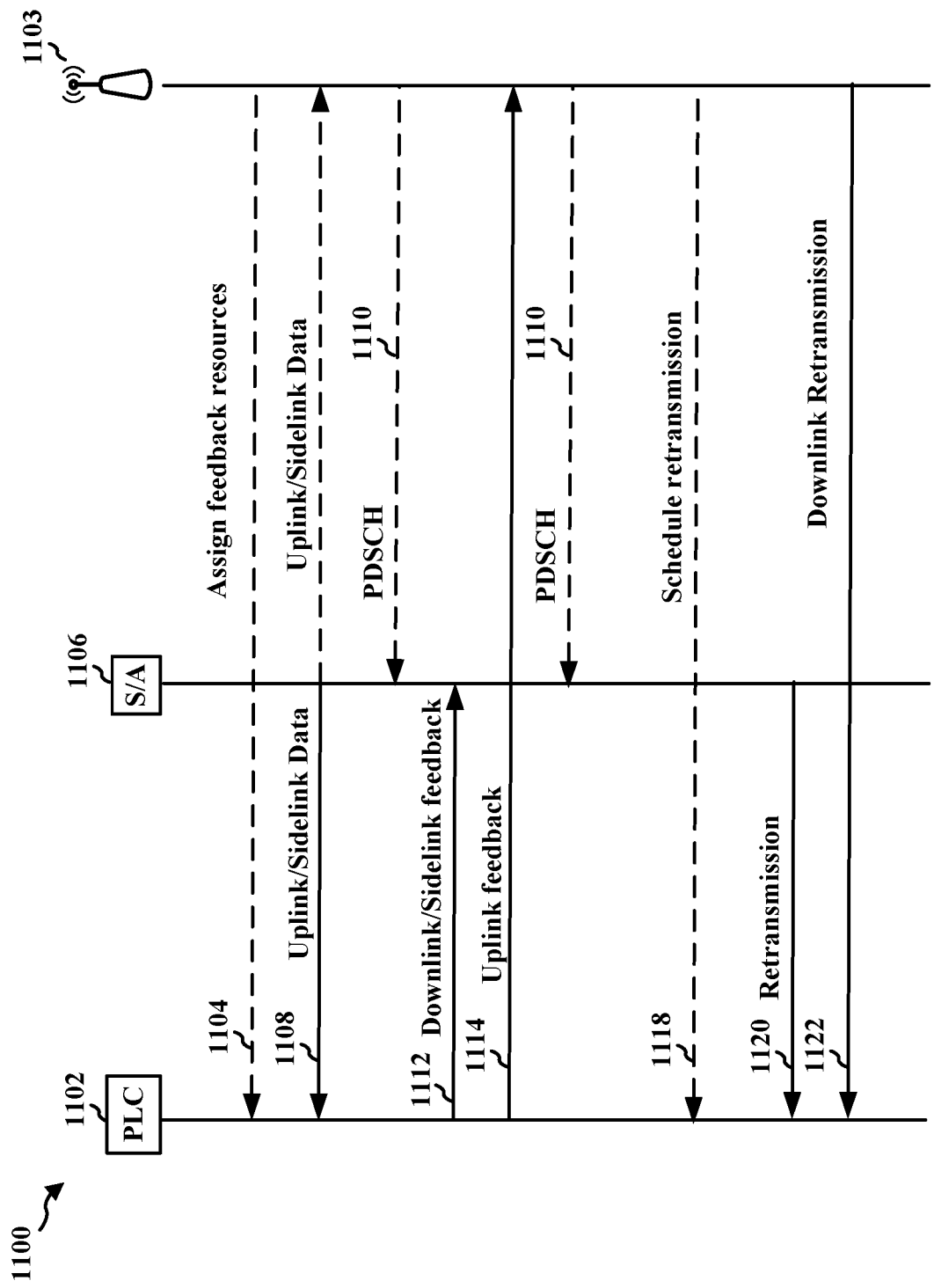
FIG. 11 illustrates an example communication flow between wireless devices.

FIG. 11 illustrates an example communication flow 1100 between a PLC 1102, a sensor/actuator 1106, and a base station 1103. The PLC 1102 may correspond to the PLC 702a or 702b, or 802, or 902. The sensor(s)/actuator(s) 1106 may correspond to sensor/actuator 706a, 706b, 706c, 706d, 806, 906a, or 906b. The base station may correspond to the base station 703 or 903. The sensor/actuator 1106 may transmit data to the PLC 1102, as PUSCH or PSSCH. The data may also be received by the base station 1103. The PLC 1102 may provide feedback 1112, e.g., HARQ feedback or a request for retransmission, to the sensor/actuator 1106. The PLC 1102 may provide feedback 1114, e.g., HARQ feedback or a request for retransmission, to the base station 1103. The feedback 1114 may be transmitted using resources assigned by the base station in an assignment transmission 1104 to the PLC 1102. In response, the base station 1103 may transmit a retransmission 1122 of the uplink/sidelink data transmission 1108 that was initially transmitted by the sensor/actuator 1106. The sensor/actuator 1106 may also send a retransmission 1120, e.g., as an uplink retransmission or a sidelink retransmission to the PLC 1102. The retransmissions 1120, 1122 may overlap, e.g., as described in connection with the example in FIG. 10. In some examples, the base station 1103 may send a control channel 1118, e.g., PDCCH, scheduling the retransmission 1122. In some examples, the base station 1103 may provide a gap in a PDSCH transmission 1110 to monitor for the feedback 1114 from the PLC 1102, e.g., as illustrated in the example in FIG. 10.

Figure 12:
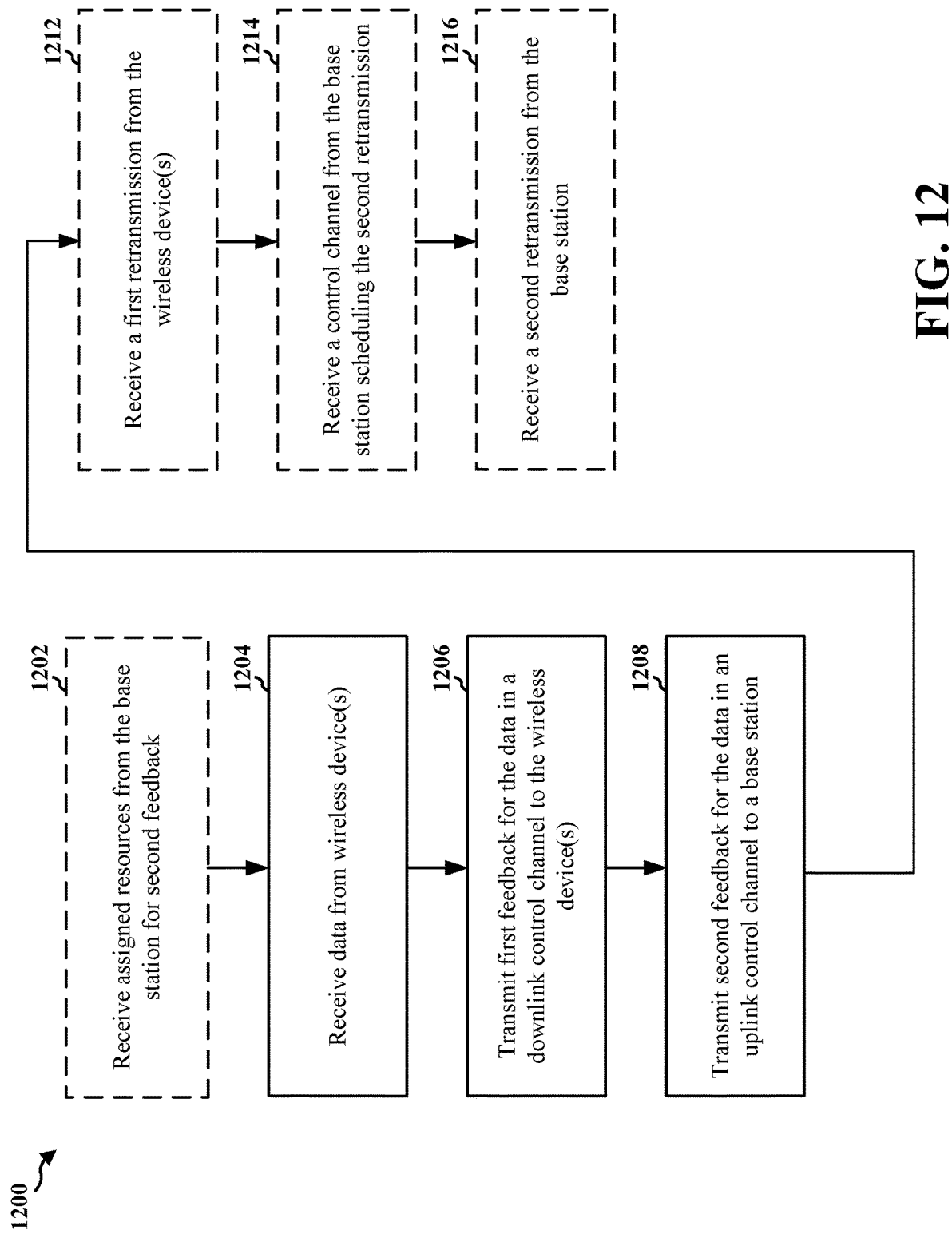
FIG. 12 is a flowchart of a method of wireless communication.

FIG. 12 is a flowchart 1200 of a method of wireless communication. The method may be performed by a wireless device that transmits downlink or sidelink communication and the communicates with a base station using a Uu link. For example, the method may be performed by a PLC or a component of a PLC (e.g., the PLC 145, 402, 602a, 602b, 702a, 702b, 902, 1102; the device 350; the apparatus 1402; a processing system, which may include the memory 360 and which may be the entire PLC or a component of the PLC, such as the TX processor 368, the RX processor 356, and/or the controller/processor 359). Optional aspects are illustrated with a dashed line. The method may help improve reliability and/or latency of wireless communication for a device that receives uplink communication from other wireless devices and that receives downlink communication from a base station. For example, the method may help improve reliability and/or latency for IIoT devices, such as a PLC, while also improving the efficient use of wireless resources.

As illustrated at 1204, the device receives data from at least one wireless device. The data may include uplink data or sidelink data from the at least one wireless device. The at least one wireless device may include one or more sensors and/or one or more actuators, such as described in connection with FIGS. 5-11. The data may include uplink data from the wireless device(s), such as uplink data from sensor(s)/actuator(s) over a Uu connection with a PLC. The data may include sidelink data from the wireless device(s), such as sidelink data from sensor(s)/actuator(s) over a PC5 connection with a PLC. The reception of the data may be performed, e.g., by the data component 1440 of the apparatus 1402 together with the reception component 1430 in FIG. 14.

At 1206, the device transmits first feedback for the data in a downlink control channel to the at least one wireless device. For example, the first feedback may be transmitted from a PLC to the sensor(s)/actuator(s) that transmitted uplink data, such as described in connection with FIG. 10 or FIG. 11. The first feedback may include HARQ feedback, such as a NACK, and/or or an indication for retransmission of the data. The transmission of the first feedback may be performed, e.g., by the feedback component 1442 of the apparatus 1402 together with the transmission component 1434 in FIG. 14.

At 1208, the device transmits second feedback for the data in an uplink control channel to a base station. For example, the first feedback may be transmitted from a PLC to a base station about uplink data from sensor(s)/actuator(s) that transmitted uplink data, such as described in connection with FIG. 10 or FIG. 11. The first feedback for the data and the second feedback for the data may be transmitted in a same symbol, such as illustrated in the example in FIG. 10. In particular, the first feedback and the second feedback may be multiplexed in the frequency domain of the same symbol. FIG. 10 illustrates an example of the first and second feedback being multiplexed in the frequency domain of the same symbol. The second feedback may include HARQ feedback, such as a NACK, and/or or an indication for retransmission from the base station of the data from the at least one wireless device (e.g., from the sensor(s)/actuator(s)). The transmission of the second feedback may be performed, e.g., by the feedback component 1442 of the apparatus 1402 together with the transmission component 1434 in FIG. 14.

The first feedback and the second feedback may be transmitted in one or more symbols, e.g., as described in connection with FIG. 10. As illustrated in FIG. 10, the first feedback and the second feedback may be transmitted in a symbol within another downlink transmission from the base station, e.g., the base station's retransmission to another wireless device such as a sensor/actuator. The base station may provide a gap of at least one symbol around the symbol in which the first and second feedback are transmitted. FIG. 10 illustrates an example gap surrounding the ACK/NACK from the PLC. FIG. 11 illustrates PDSCH from the base station that surrounds the downlink feedback and the uplink feedback from the PLC.

As illustrated at 1202, the device may receive assigned resources from the base station for the second feedback, and the second feedback may be transmitted to the base station using the assigned resources. The reception of the assigned resources may be performed, e.g., by the resource assignment component 1444 of the apparatus 1402 in FIG. 14. For example, FIG. 11 illustrates an example in which the base station assigns feedback resources that are used by the PLC to transmit feedback for the data from the sensor/actuator.

In response to transmitting the first and second feedback, the device may receive a first retransmission of the data from the at least one wireless device in response to the first feedback, at 1212, and may receive a second retransmission of the data from the base station in response to the second feedback, at 1216. The reception of the first retransmission and/or the second retransmission may be performed, e.g., by the retransmission component 1446 via the reception component 1430 of the apparatus 1402 in FIG. 14. FIGS. 10 and 11 illustrate examples of the retransmission of the data from both the base station and the sensor/actuator. As illustrated in FIG. 10, the second retransmission of the data may be received in overlapping symbols with the first retransmission of the data.

As illustrated at 1214, the device may receive a control channel from the base station scheduling the second retransmission of the data, and the control channel may be received in an overlapping symbol with the first retransmission of the data from the at least one wireless device. The reception of the control channel may be performed, e.g., by the control channel component 1448 via the reception component 1430 of the apparatus 1402 in FIG. 14.

The method may be performed by an apparatus that includes components configured to perform each of the blocks of the algorithm in the aforementioned flowchart of FIG. 12 and/or the aspects described in connection with any of FIGS. 5-11. As such, each block in the aforementioned flowchart of FIG. 12 and/or the aspects described in connection with any of FIGS. 5-11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
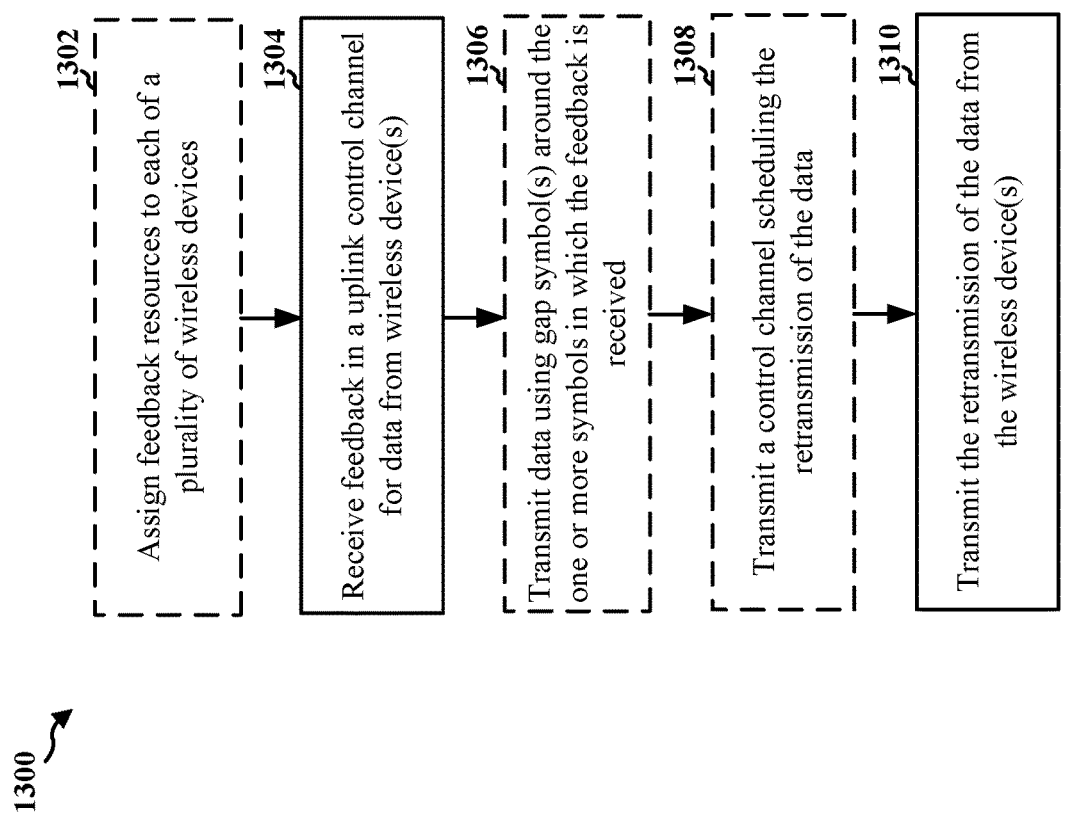
FIG. 13 is a flowchart of a method of wireless communication.

FIG. 13 is a flowchart 1300 of a method of wireless communication. The method may be performed by a base station or a component of a base station (e.g., the base station 102, 180, 310, 403, 603, 703, 903, 1103; the apparatus 1502; a processing system, which may include the memory 376 and which may be the entire base station 310 or a component of the base station 310, such as the TX processor 316, the RX processor 370, and/or the controller/processor 375). Optional aspects are illustrated with a dashed line. The method may help improve reliability and/or latency of wireless communication involving a device that receives uplink communication from other wireless devices and that receives downlink communication from a base station. For example, the method may help improve reliability and/or latency of IIoT devices, such as a PLC, while also improving the efficient use of wireless resources.

At 1304, the base station receives, in an uplink control channel from a wireless device, first feedback for data that the wireless device received from at least one additional wireless device. The reception of the feedback may be performed, e.g., by the feedback component 1540 of the apparatus 1502, e.g., via the reception component 1530 in FIG. 15. The first feedback may be received, e.g., from a PLC for data from at least one sensor/actuator, e.g., as described in connection with any of FIGS. 4A-11. The data may include uplink data or sidelink data from the at least one additional wireless device. The first feedback may include HARQ feedback or an indication for retransmission of the data. The first feedback may be multiplexed in a same symbol with second feedback for the data that the wireless device transmits in a downlink control channel to the at least one additional wireless device. FIG. 10 illustrates an example of a PLC multiplexing downlink feedback to a sensor/actuator and uplink feedback to a base station about data from the sensor/actuator.

As illustrated at 1302, the base station may assign feedback resources to each of a plurality of wireless devices. The assignment of the feedback resources may be performed, e.g., by the resource component 1542 of the apparatus 1502 in FIG. 15. The first feedback that is received at 1304 may be received from the wireless device using a feedback resource assigned to the wireless device.

The first feedback may be received in one or more symbols. As illustrated at 1306, the base station may transmit downlink communication, where the downlink communication is transmitted using a gap of at least one symbol around the one or more symbols in which the first feedback is received. The transmission of the downlink communication may be performed, e.g., by the data component 1544 via the transmission component 1534 of the apparatus 1502 in FIG. 15. FIG. 10 illustrates an example gap in a downlink transmission from a base station surrounding symbol(s) for feedback from a PLC.

At 1310, the base station transmits a retransmission of the data to the wireless device in response to receiving the first feedback. FIGS. 10 and 11 illustrate example aspects of the data retransmission. The retransmission of the data may be transmitted in overlapping symbols with an additional retransmission of the data from the at least one additional wireless device. FIG. 10 illustrates an example of overlapping retransmissions. The transmission of the retransmission may be performed, e.g., by the retransmission component 1546 of the apparatus 1502 together with the transmission component 1534 in FIG. 15.

As illustrated at 1308, the base station may transmit a control channel to the wireless device scheduling the retransmission of the data. The control channel may be transmitted in an overlapping symbol with the additional retransmission of the data from the at least one additional wireless device, as illustrated in the example in FIG. 10. The transmission of the control channel may be performed, e.g., by the control channel component 1548 via the transmission component 1534 of the apparatus 1502 in FIG. 15.

The method may be performed by an apparatus that includes components configured to perform each of the blocks of the algorithm in the aforementioned flowchart of FIG. 13 and/or the aspects described in connection with any of FIGS. 5-11. As such, each block in the aforementioned flowchart of FIG. 13 and/or the aspects described in connection with any of FIGS. 5-11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
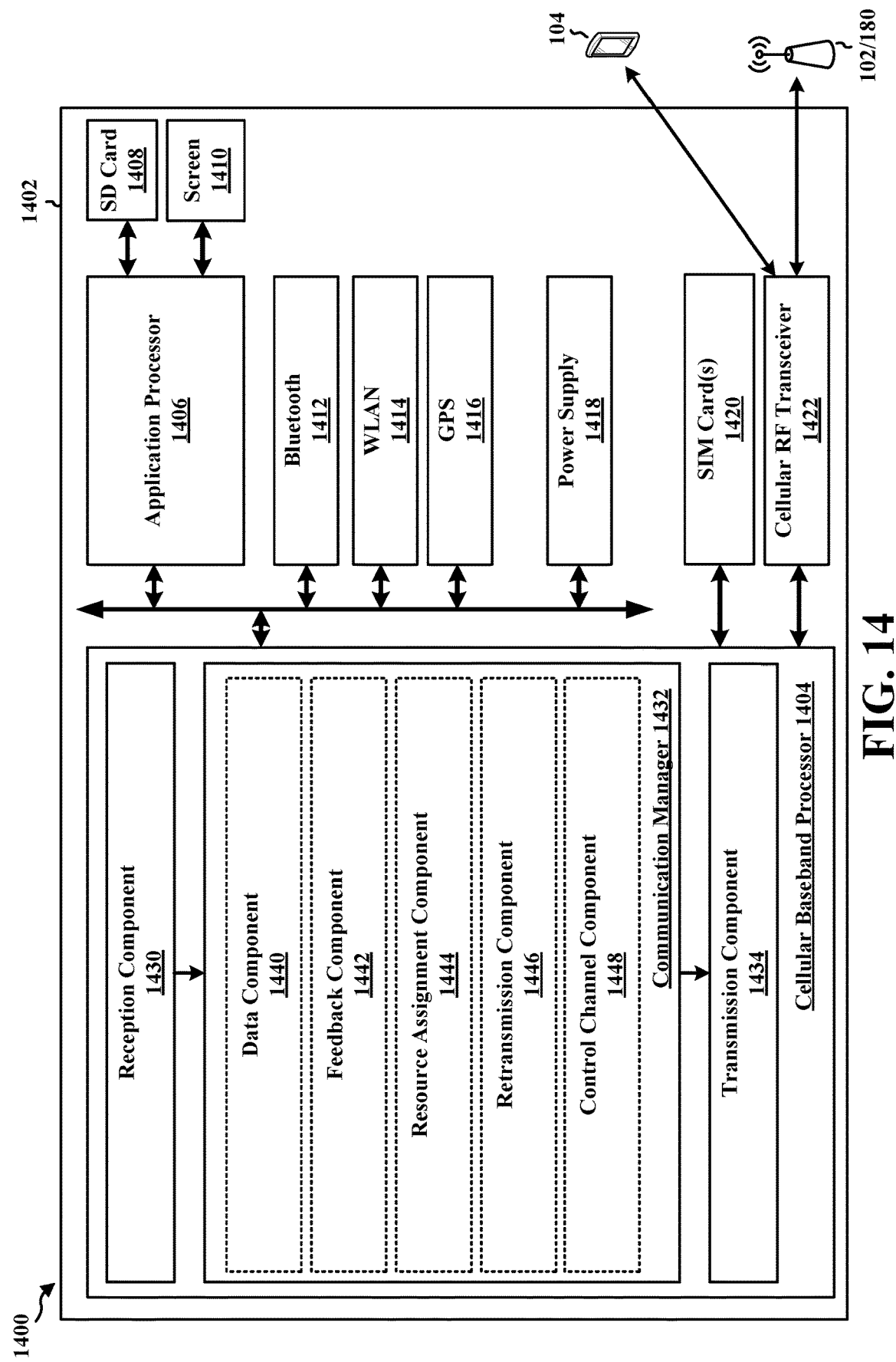
FIG. 14 is a diagram illustrating an example of a hardware implementation for an example apparatus.

FIG. 14 is a diagram 1400 illustrating an example of a hardware implementation for an apparatus 1402. The apparatus 1402 is a PLC and includes a cellular baseband processor 1404 (also referred to as a modem) coupled to a cellular RF transceiver 1422 and one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, and a power supply 1418. The cellular baseband processor 1404 communicates through the cellular RF transceiver 1422 with the UE 104 and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the device 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire device (e.g., see 350 of FIG. 3) and include the aforediscussed additional modules of the apparatus 1402.

The communication manager 1432 includes a data component 1440 that may be configured, together with the reception component 1430, to receive data from at least one wireless device, e.g., as described in connection with 1204 in FIG. 12. The communication manager 1432 further includes a feedback component 1442 that may be configured, together with the transmission component 1434, to transmit first feedback for the data in a downlink control channel to the at least one wireless device, e.g., as described in connection with 1206 in FIG. 12. The feedback component 1442 may be further configured, together with the transmission component 1434, to transmit second feedback for the data in an uplink control channel to a base station, e.g., as described in connection with 1208 in FIG. 12. The apparatus 1402 may further include a resource assignment component 1444 configured to receive assigned resources from the base station for the second feedback, and the second feedback may be transmitted to the base station using the assigned resources, e.g., as described in connection with 1202 in FIG. 12. The apparatus 1402 may further include a retransmission component 1446 configured to receive a first retransmission of the data from the at least one wireless device in response to the first feedback and/or a second retransmission of the data from the base station in response to the second feedback, e.g., as described in connection with 1212 and/or 1216 in FIG. 12. The apparatus 1402 may further include a control channel component 1448 configured to receive a control channel from the base station scheduling the second retransmission of the data, e.g., as described in connection with 1214 in FIG. 12.

The apparatus may include additional components that perform each of the blocks of the algorithm in the aforementioned flowchart of FIG. 12. As such, each block in the aforementioned flowchart of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the cellular baseband processor 1404, includes means for receiving data from at least one wireless device; means for transmitting first feedback for the data in a downlink control channel to the at least one wireless device; and means for transmitting second feedback for the data in an uplink control channel to a base station. The aforementioned means may be one or more of the aforementioned components of the apparatus 1402 configured to perform the functions recited by the aforementioned means. As described supra, the apparatus 1402 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 15:
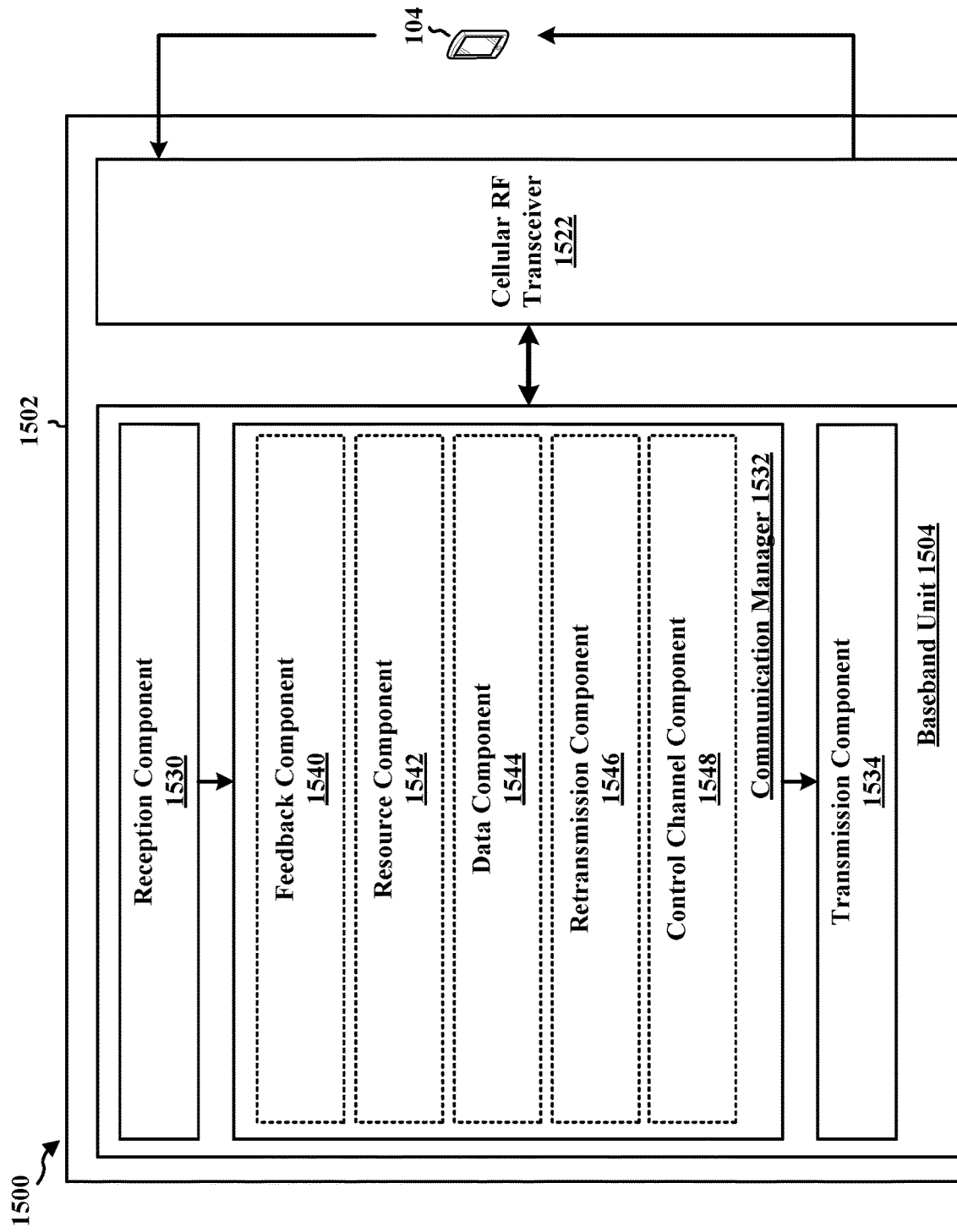
FIG. 15 is a diagram illustrating an example of a hardware implementation for an example apparatus.

FIG. 15 is a diagram 1500 illustrating an example of a hardware implementation for an apparatus 1502. The apparatus 1502 is a BS and includes a baseband unit 1504. The baseband unit 1504 may communicate through a cellular RF transceiver 1522 with the UE 104. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband unit 1504. The baseband unit 1504 may be a component of the BS 310 and may include the memory 376 and/or at least one of the TX processor 316, the RX processor 370, and the controller/processor 375.

The communication manager 1532 includes a feedback component 1540 that may be configured, together with the reception component 1530, to receive, in an uplink control channel from a wireless device, first feedback for data from at least one additional wireless device, where the first feedback is multiplexed in a same symbol with second feedback for the data in a downlink control channel to the at least one additional wireless device, e.g., as described in connection with 1304 in FIG. 13. The apparatus 1502 may include a retransmission component 1546 configured to transmit a retransmission of the data to the wireless device in response to receiving the first feedback via the transmission component 1534, e.g., as described in connection with 1310 in FIG. 13. The apparatus 1502 may further include a data component 1544 configured to transmit downlink communication, e.g., as described in connection with 1306 of FIG. 13. The apparatus 1502 may further include a control channel component 1548 configured to transmit a control channel to the wireless device scheduling the retransmission of the data, e.g., as described in connection with 1308 of FIG. 13. The apparatus 1502 may further include a resource component 1542 configured to assign feedback resources to each of a plurality of wireless devices, e.g., as described in connection with 1302 of FIG. 13.

The apparatus may include additional components that perform each of the blocks of the algorithm in the aforementioned flowchart of FIG. 13. As such, each block in the aforementioned flowchart of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1502, and in particular the baseband unit 1504, includes means for receiving, in an uplink control channel from a wireless device, first feedback for data from at least one additional wireless device; and means for transmitting a retransmission of the data to the wireless device in response to receiving the first feedback. The aforementioned means may be one or more of the aforementioned components of the apparatus 1502 configured to perform the functions recited by the aforementioned means. As described supra, the apparatus 1502 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The following aspects are illustrative only and may be combined with other aspects or teachings described herein, without limitation.

Aspect 1 is a method of wireless communication, comprising: receiving data from at least one wireless device; transmitting first feedback for the data in a downlink control channel to the at least one wireless device; and transmitting second feedback for the data in an uplink control channel to a base station.

Aspect 2 is the method of aspect 1, further includes that the first feedback for the data and the second feedback for the data are transmitted in a same symbol.

Aspect 3 is the method of any of aspects 1 and 2, where the data comprises uplink data or sidelink data from the at least one wireless device.

Aspect 4 is the method of any of aspects 1 to 3, where the first feedback includes HARQ feedback or an indication for retransmission of the data.

Aspect 5 is the method of any of aspects 1 to 4, where the second feedback includes HARQ feedback or an indication for retransmission from the base station of the data from the at least one wireless device.

Aspect 6 is the method of any of aspects 1 to 5, where the at least one wireless device includes a sensor or an actuator.

Aspect 7 is the method of any of aspects 1 to 6, where the method is performed by a PLC, and where the at least one wireless device includes at least one sensor or at least one actuator.

Aspect 8 is the method of any of aspects 1 to 7, where the first feedback and the second feedback are transmitted in one or more symbols, the method further comprising: receiving downlink communication from the base station, where the downlink communication is received with a gap of at least one symbol around the one or more symbols in which the first feedback and the second feedback are transmitted.

Aspect 9 is the method of any of aspects 1 to 8, further comprising: receiving assigned resources from the base station for the second feedback, where the second feedback is transmitted to the base station using the assigned resources.

Aspect 10 is the method of any of aspects 1 to 9, further comprising: receiving a first retransmission of the data from the at least one wireless device in response to the first feedback; and receiving a second retransmission of the data from the base station in response to the second feedback.

Aspect 11 is the method of any of aspects 1 to 10, where the second retransmission of the data is received in overlapping symbols with the first retransmission of the data.

Aspect 12 is the method of any of aspects 1 to 11, further comprising: receiving a control channel from the base station scheduling the second retransmission of the data, where the control channel is received in an overlapping symbol with the first retransmission of the data from the at least one wireless device.

Aspect 13 is an apparatus for wireless communication including at least one processor coupled to a memory and configured to implement a method as in any of aspects 1 to 12.

Aspect 14 is an apparatus for wireless communication including means for implementing a method as in any of aspects 1 to 12.

Aspect 15 is a computer-readable medium storing computer executable code, where the code when executed by a processor causes the processor to implement a method as in any of aspects 1 to 12.

Aspect 16 is a method of wireless communication at a base station, comprising: receiving, in an uplink control channel from a wireless device, first feedback for data from at least one additional wireless device, wherein the first feedback is multiplexed in a same symbol with second feedback for the data in a downlink control channel to the at least one additional wireless device; and transmitting a retransmission of the data to the wireless device in response to receiving the first feedback.

Aspect 17 is the method of aspect 16, where the data comprises uplink data or sidelink data from the at least one additional wireless device.

Aspect 18 is the method of any of aspects 16 and 17, where the first feedback includes hybrid automatic repeat request (HARQ) feedback or an indication for retransmission of the data.

Aspect 19 is the method of any of aspects 16 to 18, where the first feedback is received from a programmable logic controller (PLC), and where the at least one additional wireless device includes at least one sensor or at least one actuator.

Aspect 20 is the method of any of aspects 16 to 19, where the first feedback is received in one or more symbols, the method further comprising: transmitting downlink communication, where the downlink communication is transmitted using a gap of at least one symbol around the one or more symbols in which the first feedback is received.

Aspect 21 is the method of any of aspects 16 to 20, further comprising: assigning feedback resources to each of a plurality of wireless devices, where the first feedback is received from the wireless device using a feedback resource assigned to the wireless device.

Aspect 22 is the method of any of aspects 16 to 21, where the retransmission of the data is transmitted in overlapping symbols with an additional retransmission of the data from the at least one additional wireless device.

Aspect 23 is the method of any of aspects 16 to 22, further comprising: transmitting a control channel to the wireless device scheduling the retransmission of the data, where the control channel is transmitted in an overlapping symbol with the additional retransmission of the data from the at least one additional wireless device.

Aspect 24 is an apparatus for wireless communication including at least one processor coupled to a memory and configured to implement a method as in any of aspects 16 to 23.

Aspect 25 is an apparatus for wireless communication including means for implementing a method as in any of aspects 16 to 23.

Aspect 26 is a computer-readable medium storing computer executable code, where the code when executed by a processor causes the processor to implement a method as in any of aspects 16 to 23.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
receiving data from at least one wireless device;
transmitting first feedback for the data in a downlink control channel to the at least one wireless device; and
transmitting second feedback for the data in an uplink control channel to a base station,
wherein the first feedback for the data and the second feedback for the data are transmitted in a same symbol.

2. The method of claim 1, wherein the first feedback and the second feedback are multiplexed in a frequency domain of a same symbol.

3. The method of claim 1, wherein the data comprises uplink data or sidelink data from the at least one wireless device.

4. The method of claim 1, wherein the first feedback includes hybrid automatic repeat request (HARQ) feedback or an indication for retransmission of the data.

5. The method of claim 1, wherein the second feedback includes hybrid automatic repeat request (HARQ) feedback or an indication for retransmission from the base station of the data from the at least one wireless device.

6. The method of claim 5, wherein the at least one wireless device includes a sensor or an actuator.

7. The method of claim 1, wherein the method is performed by a programmable logic controller (PLC), and wherein the at least one wireless device includes at least one sensor or at least one actuator.

8. The method of claim 1, wherein the first feedback and the second feedback are transmitted in one or more symbols, the method further comprising:
receiving downlink communication from the base station, wherein the downlink communication is received with a gap of at least one symbol around the one or more symbols in which the first feedback and the second feedback are transmitted.

9. The method of claim 1, further comprising:
receiving assigned resources from the base station for the second feedback, wherein the second feedback is transmitted to the base station using the assigned resources.

10. The method of claim 1, further comprising:
receiving a first retransmission of the data from the at least one wireless device in response to the first feedback; and
receiving a second retransmission of the data from the base station in response to the second feedback.

11. The method of claim 10, wherein the second retransmission of the data is received in overlapping symbols with the first retransmission of the data.

12. The method of claim 10, further comprising:
receiving a control channel from the base station scheduling the second retransmission of the data, wherein the control channel is received in an overlapping symbol with the first retransmission of the data from the at least one wireless device.

13. An apparatus for wireless communication, comprising:
a memory; and
at least one processor coupled to the memory and configured to
receive data from at least one wireless device;
transmitting first feedback for the data in a downlink control channel to the at least one wireless device; and
transmit second feedback for the data in an uplink control channel to a base station,
wherein the first feedback for the data and the second feedback for the data are transmitted in a same symbol.

14. The apparatus of claim 13, wherein the data comprises uplink data or sidelink data from the at least one wireless device.

15. The apparatus of claim 13, wherein the at least one processor comprises a programmable logic controller (PLC), and wherein the at least one wireless device includes at least one sensor or at least one actuator.

16. The apparatus of claim 13, wherein the first feedback and the second feedback are transmitted in one or more symbols, the at least one processor is further configured to:
receive downlink communication from the base station, wherein the downlink communication is received with a gap of at least one symbol around the one or more symbols in which the first feedback and the second feedback are transmitted.

* * * * *